United States Patent
Black et al.

(10) Patent No.: US 9,618,257 B2
(45) Date of Patent: Apr. 11, 2017

(54) GAS-FLOW CRYOSTAT FOR DYNAMIC TEMPERATURE REGULATION USING A FLUID LEVEL SENSOR

(75) Inventors: Randall Black, San Diego, CA (US); Dinesh Martien, San Diego, CA (US); William Neils, San Diego, CA (US)

(73) Assignee: QUANTUM DESIGN INTERNATIONAL, INC., San Diego, CA (US)

( * ) Notice: Subject to any disclaimer, the term of this patent is extended or adjusted under 35 U.S.C. 154(b) by 0 days.

(21) Appl. No.: 13/244,680

(22) Filed: Sep. 25, 2011

(65) Prior Publication Data

US 2012/0011859 A1 Jan. 19, 2012

Related U.S. Application Data

(63) Continuation of application No. 12/797,556, filed on Jun. 9, 2010, now abandoned.

(51) Int. Cl.
| | |
|---|---|
| *F17C 7/04* | (2006.01) |
| *F17C 13/02* | (2006.01) |
| *F17C 13/04* | (2006.01) |
| *F25D 31/00* | (2006.01) |
| *F25D 19/00* | (2006.01) |

(Continued)

(52) U.S. Cl.
CPC ............. *F25D 19/00* (2013.01); *F17C 3/085* (2013.01); *F17C 13/006* (2013.01); *G01F 23/263* (2013.01); *F17C 2250/0408* (2013.01); *F17C 2250/0417* (2013.01); *F17C 2250/061* (2013.01); *F17C 2250/0636* (2013.01);

(Continued)

(58) Field of Classification Search
CPC . F17C 13/006–13/007; F17C 2227/046; F17C 2250/0408–2250/0417; F17C 2250/061; F17C 2250/0636
USPC ....... 62/6, 48.1, 48.2, 49.1, 49.2, 50.1, 51.1, 62/511, 131; 165/301, 302
See application file for complete search history.

(56) References Cited

U.S. PATENT DOCUMENTS 3,424,230 A * 1/1969 Wright, Jr. .................... 165/263
3,882,687 A 5/1975 Asztalos
(Continued)

OTHER PUBLICATIONS

Hilton, D. K., et al. "A capacitive liquid helium level sensor instrument." Cryogenics 39.5 (1999): 485-487.*
(Continued)

*Primary Examiner* — John F Pettitt
*Assistant Examiner* — Tareq Alosh
(74) *Attorney, Agent, or Firm* — Stetina Brunda Garred and Brucker; Mark Garred

(57) ABSTRACT

A gas-flow cryostat adapted for dynamic temperature regulation using a fluid level sensor; the cryostat further including one or more heaters coupled to various components of the cryostat. As fluid evaporates from a liquid cryogen evaporation reservoir within the cryostat, the fluid level sensor and a feedback control unit are adapted to monitor and dynamically control the level of evaporating cryogen by regulating the heaters. Accordingly, the cryostat is adapted to dynamically control temperature about a specimen region within the cryostat. The cryostat can be used in various applications, including analytical laboratory equipment for measuring various physical properties of samples. Temperature sensors are further incorporated for added control and optimization of the cryostat.

20 Claims, 6 Drawing Sheets

(51) Int. Cl.
*F17C 13/00* (2006.01)
*F17C 3/08* (2006.01)
*G01F 23/26* (2006.01)
*F28F 3/12* (2006.01)

(52) U.S. Cl.
CPC ....... *F25B 2400/01* (2013.01); *F25B 2400/17* (2013.01); *F25B 2700/04* (2013.01); *F28F 3/12* (2013.01)

(56) References Cited

U.S. PATENT DOCUMENTS

| | | | | |
|---|---|---|---|---|
| 4,485,640 | A | * | 12/1984 | Bon Mardion et al. ....... 62/49.2 |
| 4,489,569 | A | | 12/1984 | Sitte |
| 4,744,222 | A | * | 5/1988 | Murai ............... 62/49.2 |
| 4,831,845 | A | * | 5/1989 | Oda ............. G01N 25/12 374/176 |
| 4,848,093 | A | * | 7/1989 | Simmonds et al. .......... 62/49.1 |
| 5,272,881 | A | * | 12/1993 | Lee ............... 62/50.4 |
| 6,011,456 | A | * | 1/2000 | Eckels et al. ........... 335/300 |
| 6,205,794 | B1 | | 3/2001 | Brothers |
| 7,430,872 | B2 | * | 10/2008 | Strobel ............ 62/51.1 |
| 2002/0092357 | A1 | | 7/2002 | Theriault |
| 2007/0051116 | A1 | * | 3/2007 | Glemot et al. ............ 62/51.1 |
| 2007/0089432 | A1 | * | 4/2007 | Boesel et al. ............ 62/51.1 |
| 2008/0290869 | A1 | * | 11/2008 | Hutton .............. G01R 33/30 324/318 |

OTHER PUBLICATIONS

Product Catalog from Datacomp Electronics Inc. Jun. 2009. Retrieved from http://www.lasallescientific.com/products/datacom/Chapter_1.pdf.*

Delong, "Continuously Operating He Evaporation Refrigerator", The Review of Scientific Instruments, Jan. 1971, pp. 147-150, vol. 42 No. 1.

Gmelin, "Multipurpose cryostat for low temperature electron irradiation of semi-conductors", Cryogenics, Nov. 1978, pp. 596-600.

Lawes, "Reduction of vibrational noise from continuously filled 1 K pots", The Review of Scientific Instruments, Dec. 1998, pp. 4176-4178, vol. 69 No. 12.

Velichkov, "Capacitive level meters for cryogenic liquids with continuous read-out", Cryogenics, Jun. 1990, vol. 30, pp. 538-544.

* cited by examiner

GAS-FLOW CRYOSTAT FOR DYNAMIC TEMPERATURE REGULATION USING A FLUID LEVEL SENSOR

CROSS-REFERENCE TO RELATED APPLICATIONS

This application is a continuation of U.S. Ser. No. 12/797,556, filed Jun. 9, 2010; the entire contents of which are hereby incorporated by reference.

FIELD OF THE INVENTION

The present invention relates to cryostats, and methods for controlling the temperature of a region or sample within a cryostat; and more particularly to cryostats and related methods useful in measuring physical properties of samples over a wide temperature range.

BACKGROUND OF THE INVENTION

Cryogenic helium flow cryostats have been used for many years to regulate temperature in systems designed to test the physical properties of laboratory specimens. The need for testing physical specimens has increased substantially over the last several years. These systems are designed to characterize the physical properties of various materials under variable measurement conditions. Furthermore, these systems are capable of being programmed for an arbitrary sequence of temperature, magnetic field sweeps, and steps at which to characterize various physical properties of the sample specimen.

It is often necessary to control the temperature of these specimens precisely over a wide range of temperature from liquid helium temperatures to well above room temperature. The instruments used for characterization often contain a number of massive components, including superconducting magnets and other cryogenic components, which, because of their mass are prohibitively time-consuming to cool-down and warm-up, or require being maintained cold in order to function. In this case, it is necessary to cycle the temperature of only the specimen or a relatively small portion of the cryostat surrounding the specimen, while the other cryogenic components, such as the superconducting magnet, are maintained at an operational cold state.

This combination of requirements has led to the development of gas-flow cryostats where the specimen is cooled by flowing refrigerated helium gas over the specimen, or the space surrounding a sealed chamber containing the specimen. The refrigerated helium gas provides the cooling power, while electrical heaters attached to the chamber provide the ability to warm the specimen. It may be necessary to vary both the flow rate and heater power to sweep and control the temperature of the specimen. Rapid thermal cycling of the specimen is possible because it is only necessary to warm the helium gas and chamber in the vicinity of the specimen. It is not necessary to warm or cool the other components in the cryostat, including the source of refrigerated helium.

The coldest possible temperatures in a gas-flow cryostat are achieved by using the vapors from boiling liquid helium as the source of refrigerated helium gas. A vacuum pump may be used to simultaneously pump on a small reservoir of liquid helium and to draw the evolving vapors over or around the specimen region in the cryostat. Because the vapors are at the same temperature as the boiling helium (typically at 1 to 2 K for the helium-4 isotope); the specimen can be cooled to near the temperature of the boiling helium. As mentioned above, because the specimen is cooled by the evolved vapors and not directly by the liquid, it is possible to quickly warm the specimen with only the use of the variable heaters without the need to warm the liquid bath.

Continuous operation is achieved by continuously filling the evaporation reservoir with liquid at low pressure using a capillary or other flow restrictor. This liquid is provided either by a larger bath of commercially liquefied helium at atmospheric pressure, or by liquefying a room-temperature helium gas stream using a cryogenic refrigerator such a Pulse Tube (PT) or Gifford-McMahon (GM) cryocooler. In a recirculating design, the room-temperature helium gas comes from the exhausting helium gas flowing from the cryostat through the pumping system.

Presently available designs of continuously filled, pumped-helium gas-flow cryostats use a variety of techniques for restricting the flow of liquid into the evaporation reservoir. One type uses a fixed capillary or orifice as the flow restrictor, See Delong et. al., "*Continuously Operating He Evaporation Refrigerator*", *The Review of Scientific Instruments*, Vol. 42, No. 1, January 1971. The geometry of this capillary is optimized to provide a specific flow rate. Flow too high can overfill the reservoir, or increase the vapor pressure and hence the boiling temperature. Flows that are too low may provide insufficient cooling power to the specimen, or cause the reservoir to run dry, and thus a sudden loss of cooling. Another type of flow restrictor in the art uses a cryogenic mechanical valve that can be adjusted in situ to change the liquid flow rate into the evaporation reservoir. Though less common, it is also possible to use a fixed-geometry restrictor, such as a capillary, in combination with attached heaters to change the effective flow impedance of the capillary by changing the temperature and hence viscosity of the helium flowing in it.

The rate at which helium gas is evaporated from the reservoir is determined by the vacuum provided by the pumping system, the geometry of the pumping lines, and the heat-load on the reservoir from inflowing liquid, parasitic heat sources, or evaporation heaters attached to the reservoir.

In these systems, the inflow rate and outflow rate are selected such that the evaporation reservoir does not dry out, and also so that the flow is not so high as to overwhelm the pumping system and thereby increase the minimum temperature. In the case where the filling rate exceeds the evaporation rate, the liquid level will rise until the inlet is starved of liquid, as might be the case with a closed recirculating system with a finite charge of helium or other cryogen gas, or until parasitic heat from the chamber heaters or the warmer regions of the cryostat increase the evaporation rate to match the inflow rate. As this happens, the flow rate and hence the cooling power available to the specimen chamber varies considerably in time as filling occurs.

In the case where the equilibrium liquid level depends on heat from the specimen, the level can vary with specimen temperature if the accumulated liquid level is sufficiently close to the specimen chamber/exchanger region. For example, if the specimen chamber is allowed to cool to near the boiling point of the helium, there may be very little heat from the chamber and the liquid level could rise, thus increasing the thermal coupling between the liquid and the specimen chamber. Once the liquid level has risen, application of heat to the specimen, as is done when routinely increasing the specimen temperature, results in transfer of heat into the liquid and thus increased boil off and cooling power. This increased cooling power will require a compensating increase in the heater power needed to affect a given temperature rise. The increased boil off will reduce the level of the liquid over time, and thus decrease the cooling power, resulting in poor temperature stability.

Thus, while gas-flow cryostats are very capable for achieving rapid temperature changes over a wide range of temperatures down to pumped liquid helium temperatures, the lack of liquid level and flow-rate control limits the temperature stability that is possible with such systems. This is a significant limitation for many applications, such as specific heat or thermal conductivity measurements, where small fluctuations in the temperature of the specimen and experiment region can lead to significant errors in the physical property measurement.

SUMMARY OF THE INVENTION

In the following descriptions, a technique is disclosed for regulating the liquid level in the evaporation reservoir of an evaporative gas-flow cryostat, thus achieving high temperature stability and gas-flow stability over a wide range of temperatures, including at the lowest possible temperature, the saturation temperature of the liquid cryogen, for example helium.

The disclosed methods involve placing a helium liquid level meter with continuous readout into the evaporation reservoir, and then using a feedback technique, such as a feedback control unit, to change the heat applied to the reservoir and/or change the inlet flow past the flow restrictor to achieve a regulated liquid level. An increase in liquid level would cause the feedback loop to increase the evaporation rate or decrease the filling rate. A decrease in liquid level would cause the feedback loop to decrease the evaporation rate or increase the filling rate, as appropriate to restore the liquid level to its pre-determined fill point.

A key technology required to accomplish these methods is a suitable liquid level meter. In the preferred embodiment, this level meter must function in liquid helium below its superfluid transition temperature. This requirement reduces the number of eligible candidates from currently available technologies.

Liquid helium level meters are often used in liquid helium cryostats to provide a periodic or continuous readout of liquid level for the purpose of indicating when a liquid transfer is necessary, or when it is necessary to automatically increase or decrease the liquid level for cryo-cooled liquid cryostats. These level meters typically consist of a self-heated superconducting wire extending vertically within the liquid reservoir. The liquid level is determined by measuring the electrical resistance of the length of the wire. With appropriate current flowing in the wire, the portion of the wire above the liquid level will exhibit an electrical resistance since it is warmed above its superconducting transition temperature by the flowing current; while the portion below the liquid level will be superconducting, and hence will contribute zero resistance to the total.

As discussed above, in an evaporative gas-flow helium cryostat, the liquid is a superfluid in the most important case of the helium-4 isotope. Unfortunately, the superconducting-wire level meter does not work in superfluid, owing to the superfluid film-flow, and also the superfluid fountain effect. Also, the heated wire dissipates unacceptable amounts of heat in to the gas flow, thus warming it above the lowest possible temperature.

Another helium level meter technology uses a continuous capacitance sensor. Capacitance level meters are commonly used for oil and fuel level sensors. They work by detecting the change in capacitance of an open gap, continuous capacitor as it is filled to varying levels with a fluid having a higher dielectric constant than the air or vapors above. Capacitive level meters have been described in the literature for cryogenic liquids, including liquid helium. The dielectric constant of liquid helium is only about 1% higher than helium vapors at the same temperature. This makes it something of a challenge to obtain good sensitivity with such a level meter, and so it is rather rarely used for normal liquid helium in helium cryostats. However, because it does not rely on heat transfer it is an ideal candidate for a level meter operating in superfluid helium.

While the preferred embodiment of the invention utilizes a capacitive level sensor that derives liquid level from a measure of the difference in dielectric constant between liquid and gas phases, it is understood that there are other sensor technologies that would be suitable for this invention. Examples of other level sensors include, but are not limited to those involving measuring changes in mechanical impedance, buoyancy, magnetic properties, thermal properties, and sound propagation. In the case of superfluid helium, this list can be extended to include measurements of superfluid properties, including, second-sound, where temperature waves might be used to echo-locate the liquid surface.

Also, while the preferred embodiment described above is for a temperature control apparatus using specifically the helium-4 isotope as the cryogen, one could substitute other two-phase cryogens, such as helium-3, nitrogen, hydrogen, argon, as well as commercial refrigerants.

BRIEF DESCRIPTION OF THE DRAWINGS

These and other attributes of the invention are further described in the following detailed description of the invention, particularly when reviewed in conjunction with the drawings, wherein.

DETAILED DESCRIPTION OF THE PREFERRED EMBODIMENTS

Figure 1:
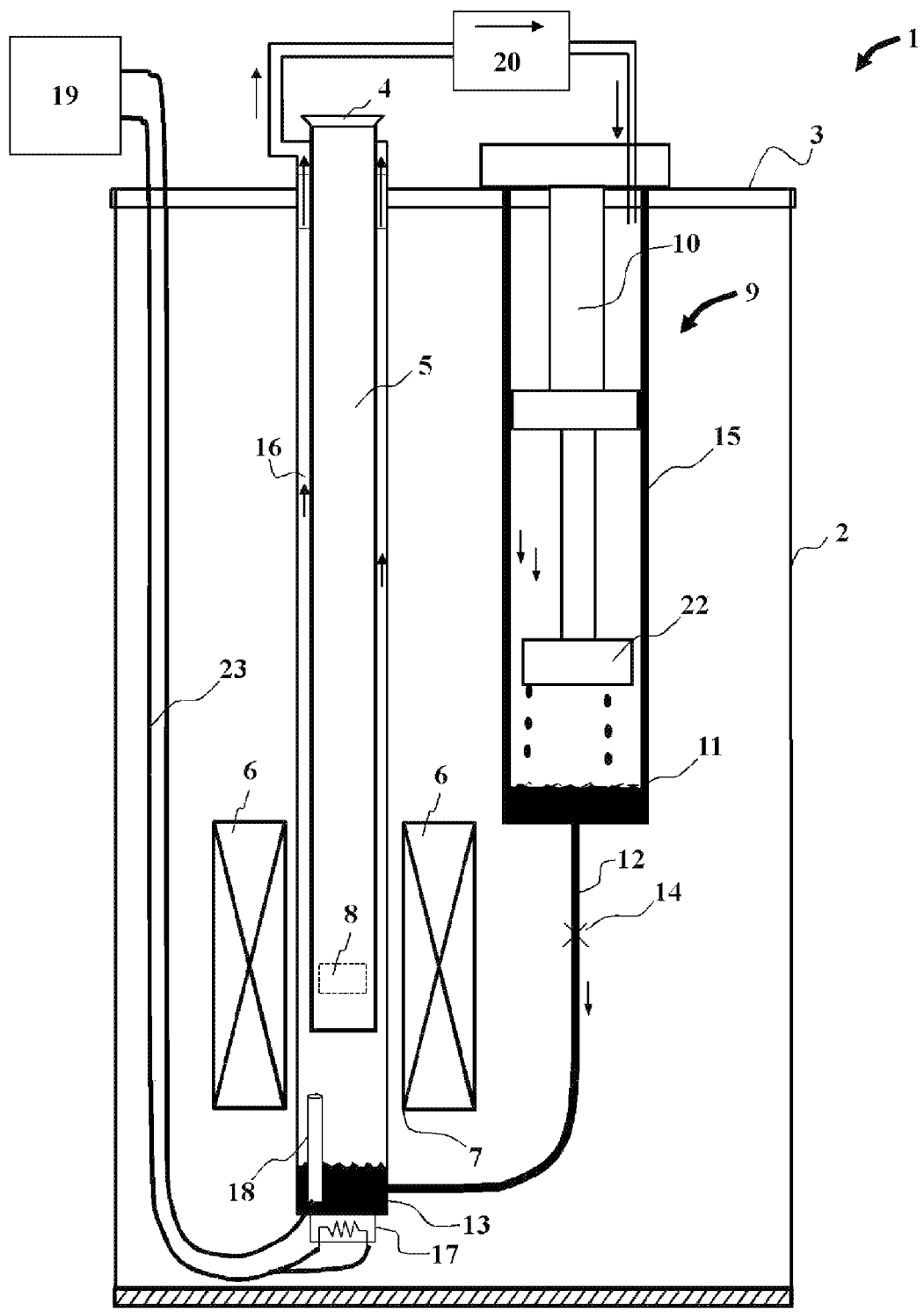
FIG. 1 illustrates a closed cycle helium cryostat containing the invention.

An exemplary embodiment of the apparatus of this invention is illustrated in FIG. 1, wherein a cryostat apparatus 1 comprises an outer vacuum chamber or outer shell 2 closed at the top by means of a top element or plate 3. While the shell 2 is shown as a distinct component from the top plate 3, in practice these two may be integral. The region outside this shell is usually at ambient temperature and pressure in air, while the volume inside this outer shell is evacuated so as to provide thermal isolation for, and between the various internal components. The top plate has openings for various penetrations into the interior of the cryostat, including a chamber access port 4 to provide access to the sample chamber 5.

Superconducting magnet 6 is shown with an inner bore 7 that houses the lower portion of the sample chamber, but is thermally isolated from it by virtue of the isolation vacuum. In this way, the temperature of the sample chamber may be varied independently from the temperature of the magnet. The specimen 8 is indicated in a region inside the sample chamber. This arrangement of sample chamber, magnet and specimen is employed since this cryostat is used as a laboratory instrument.

As an example of a source of liquid cryogen, the embodiment of FIG. 1 further includes an integral liquid helium plant 9 partially contained within the cryostat volume. The cryogen liquefaction plant 9 includes a cryogenic refrigerator 10 inserted into jacket tube 15. In this example, gas-phase helium enters the top part of the volume between the cooler 10 and the jacket tube and is progressively cooled by the refrigerator and condenses the helium into a liquid-phase pool at the bottom of the liquid helium plant. A liquid siphon port at the bottom of the plant is used to draw liquid from the pool and into the liquid conduit 12 where it subsequently passes through a flow restrictor 14 and enters an evaporation reservoir 13, where it evaporates under the influence of the relatively lower pressure in the cooling jacket 16. The evaporated gas flows up the cooling jacket in the region surrounding the sample chamber 5 and hence provides cooling for the specimen region. The specimen region is therefore adapted for temperature control by dynamically controlling the flow of gas about the specimen region. After reaching the specimen region, the helium gas flows up the length of the chamber and exits the top plate 3, passes through a vacuum pumping system 20 and flows back into the liquefaction plant at ambient temperature and gas-phase. This circulation forms a closed cycle helium loop.

While this example of cryostat uses an integral liquefaction plant, this is not required for this invention. Any suitable source of liquefied cryogen may be substituted, including a storage volume of commercially liquefied helium.

The purpose of the flow restrictor 14 is to allow for continuous evaporation from the cold reservoir. As gas-phase helium is evaporated from the reservoir, the reservoir is continuously replenished by liquid flowing through the flow restrictor 14. In the case of the liquid helium plant, it is necessary to maintain the helium pressure sufficiently high at the condenser 22 to ensure efficient condensation of liquid. The pressure in the liquid plant is usually near 1 atmosphere. Downstream of the flow restrictor 14, the pressure may be significantly less because of the vacuum pumping/circulation system. Hence the liquid in the evaporation chamber is significantly colder than the liquid in the warm reservoir 11. This is because the liquid is cooled to its saturation temperature, which for helium may be in the range of 1 to 2 K, depending on the characteristics of the vacuum pump, pumping conduits, and helium flow rates.

Also shown is an evaporation heater 17, a capacitive level sensor 18 and level-sensor measurement-and-feedback electronics 19 connected by suitable wiring 23. In this embodiment the feedback electronics measure the capacitance of the level sensor 18. The capacitance is an indication of liquid level in the evaporation reservoir 13. The feedback electronics then adjust the current in the heater to affect the evaporation rate in order to maintain a constant liquid level.

The feedback electronics, also referred to herein as a feedback control unit, can be any computerized logic unit programmed to monitor the level of liquid helium by reading a fluid sensor within the cryostat. The feedback control unit can be further connected to one or more electric heater elements, wherein the feedback control unit is adapted to adjust a level of liquid helium contained within the cold reservoir by increasing thermal energy or decreasing thermal energy using one or more electronic heaters within the cryostat.

Figure 2A:
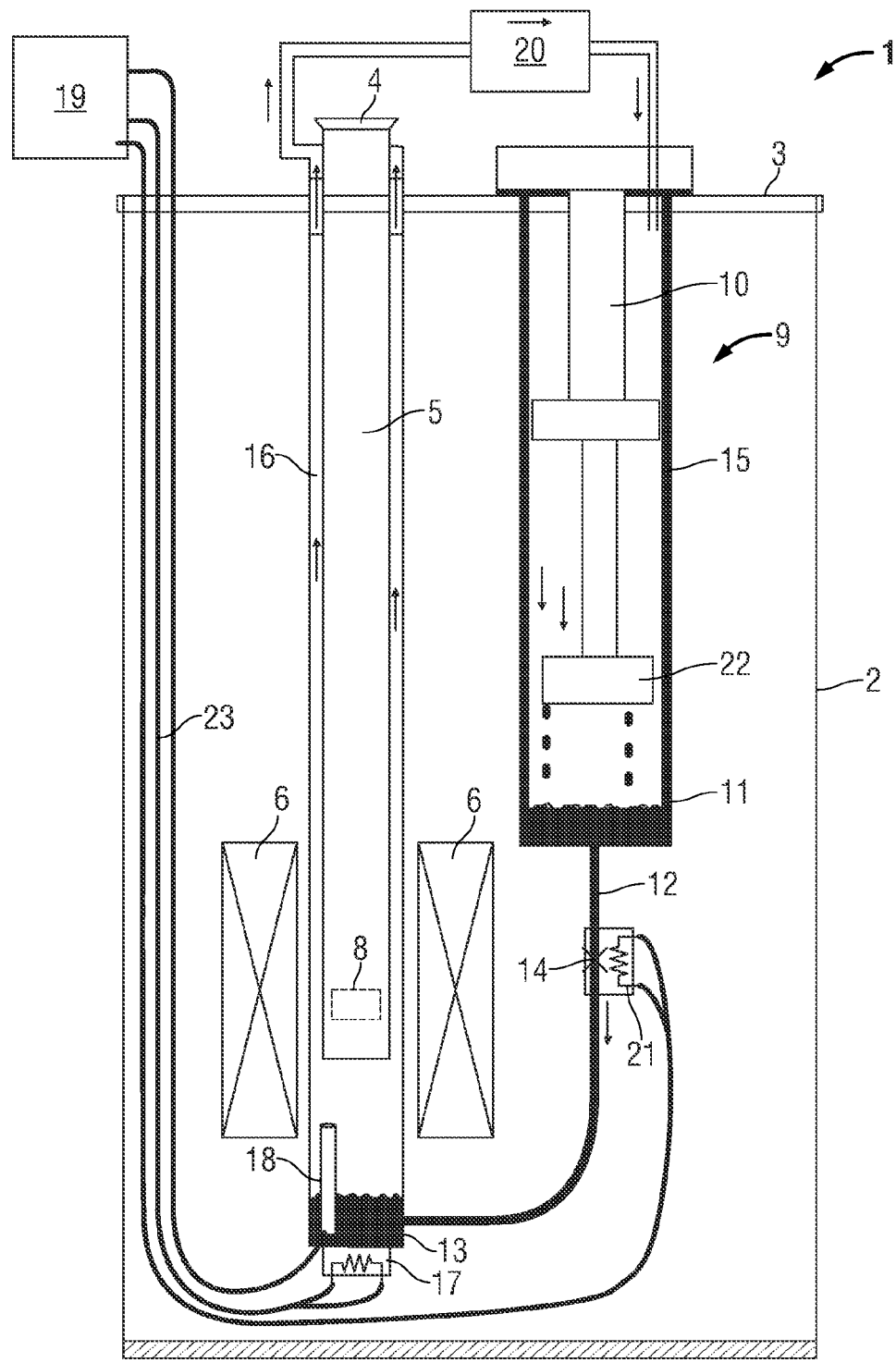
FIGS. 2A and 2B illustrate alternative embodiments including a heater on the flow restrictor, the heater coupled to a feedback control unit.

FIG. 2A illustrates an alternative embodiment of the invention with a second heater. The second heater, hereafter referred to as the impedance heater 21, is in thermal contact with the flow restrictor. In this embodiment of the invention, the primary purpose of the impedance heater 21 is to reduce the mass-flow rate of coolant into evaporation reservoir 13.

The way the impedance heater 21 alters the flow rate through the flow restrictor can be understood by considering the flow-restricting properties of a capillary tube, which is one embodiment of the flow restrictor. As liquid from the warm reservoir 11 flows through the capillary restrictor toward the evaporation reservoir 13, the pressure experienced by the liquid is reduced, thus partially vaporizing the helium. The resulting gas-phase helium within the flow restrictor has greater flow resistance for a given mass flow rate than the liquid-phase helium, thus the flow impedance depends significantly on the gas-to-liquid ratio of helium within the flow restrictor. If heat is applied to the flow restrictor using the impedance heater 21, then the gas-to-liquid ratio is increased, which, for a given pressure-drop across the flow restrictor, reduces the mass flow rate into the evaporation reservoir. This decreases the accumulation rate of liquid in the reservoir by both decreasing the in-flow of liquid and also increasing the evaporation rate because of the added heat.

As in the embodiment illustrated in FIG. 1, the system illustrated in FIG. 2A can be operated in a feedback arrangement using a liquid level meter 18 and feedback electronics 19. A particularly useful arrangement of feedback is one in which both heaters are controlled simultaneously such that the sum of the power dissipated by both heaters is a fixed value, and the ratio of the power in each heater is altered programmatically by the feedback electronics so as to maintain a constant liquid level in the reservoir. This technique has the advantage that the rate of filling, which is determined by the power in the impedance heater 21, can be controlled independently of the evaporation rate, which is determined by the sum of both heater 21 and heater 17. If the feedback control loop determines that the liquid level is too high, then the power can be increased in impedance heater 21, and decreased by the same amount in the evaporation heater 17, with the net effect that the inlet flow rate is decreased, thus decreasing the liquid level. The net evaporation rate, and hence the cooling power available from the flowing gas-phase coolant, is unchanged because the evaporation rate primarily depends on total power, which was not changed.

Figure 3:
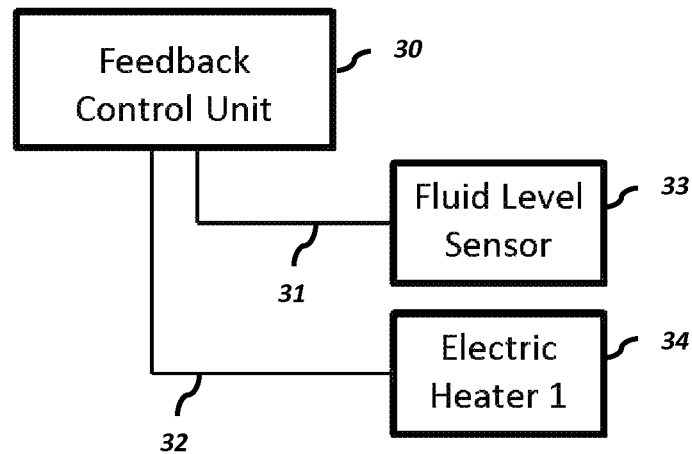
FIG. 3 illustrates a feedback control unit connected to a fluid level sensor and an electric heater for dynamic control of liquid level within an evaporation reservoir of a cryostat.

FIG. 3 further illustrates a system for dynamic control of evaporating helium within a gas-flow cryostat. As illustrated in FIG. 3, a feedback control unit 30 is connected to a fluid level sensor 33 by a first transmission line 31. The feedback control unit is further connected to an electric heater 34 by a second transmission line 32. The feedback control unit is adapted to receive a liquid level measurement from the liquid level sensor, and can be programmed to receive a liquid level measurement continuously, or at various time intervals, for example one per second, ten per second, or the like. The feedback control unit is further programmed to adjust the liquid helium level within the evaporation reservoir using the electric heater. With the heater in thermal communication with the evaporation reservoir, input energy from the electric heater will trigger an increase in evaporation of liquid-helium from the reservoir, thereby decreasing liquid helium level and decreasing temperature at the specimen region. And as discussed above, with the electric heater in thermal communication with the flow restricting element, input energy from the heater will trigger a decrease in flow of liquefied helium into the evaporation reservoir.

Figure 4:
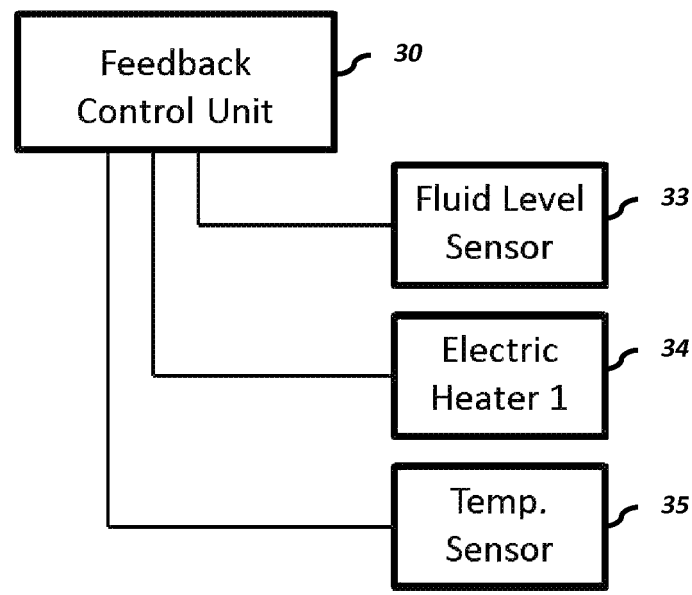
FIG. 4 illustrates a feedback control unit connected to a fluid level sensor, an electric heater, and a temperature sensor for dynamic control of liquid level within an evaporation reservoir of a cryostat.

An additional level of control is provided with the implementation of dynamic temperature adjustment. In one embodiment, as illustrated in FIG. 4, a feedback control unit 30 is connected to a fluid level sensor 33, an electric heater 34, and a temperature sensor 35. The fluid level sensor 33 is at least partially contained within the liquid helium evaporation reservoir, and provides a continuous measurement liquid helium level within the evaporation reservoir. The electric heater 34 is disposed at or near the evaporation reservoir such that an increase in energy to the electric heater 34 increases the evaporation rate of the liquid helium. A temperature sensor 35 is disposed at or near a specimen region for measuring temperature of a sample. The cryostat can be programmed to rapidly bring a sample region to a desired temperature, maintain a sample at a desired temperature, or expose a sample to a gradient of temperatures at a desired slope or interval. The feedback control unit is programmed to adjust the flow of liquid helium into the evaporation reservoir, and adjust the evaporation rate of the liquid helium, to achieve the desired temperature control.

By increasing flow of liquid helium to the evaporation reservoir, and increasing the evaporation rate of the contained liquid helium, an increased amount of evaporated gas flows about the specimen region for rapid cooling of the specimen. Once the specimen reaches a desired temperature provided by the temperature sensor 35, the feedback control unit 30 reduces and regulates flow of liquid helium into the reservoir and reduces and regulates the evaporation rate of the liquid helium using one or more electric heaters 34. The fluid-level sensor 33 continuously measures helium level within the evaporation reservoir for maintaining stability within the cryostat, i.e. preventing an over-fill or dry-out of the reservoir. The feedback control 30 unit can increase one or both of the liquid helium flow, and liquid helium evaporation, to dynamically control temperature at the specimen region.

Figure 5:
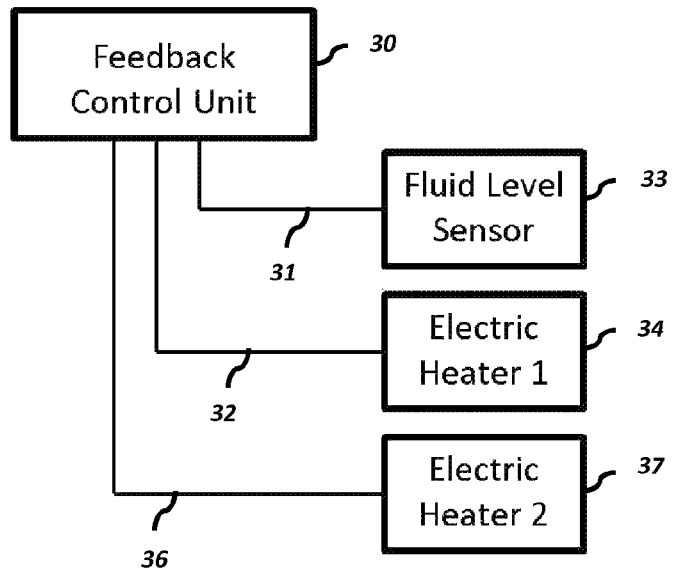
FIG. 5 illustrates a feedback control unit connected to a fluid level sensor and multiple electric heaters for dynamic control of liquid level within an evaporation reservoir of a cryostat.

In a preferred embodiment, the cryostat includes two or more electric heaters. As illustrated in FIG. 5, a feedback control unit, such as a CPU or logic circuit, is connected to a fluid level sensor, a first electric heater, and a second electric heater. In this embodiment, the first electric heater is in thermal communication with the evaporation reservoir for adjusting the evaporation rate of the liquid helium within the reservoir. The second heater is in thermal communication with the flow restricting element for adjusting the flow rate of liquid helium from the warm reservoir to the evaporation reservoir. With the first and second electric heaters, the feedback control unit is adapted to regulate the liquid helium evaporation rate as well as the liquid helium flow into the evaporation reservoir, for dynamic control of temperature at the specimen region of the cryostat.

Figure 6:
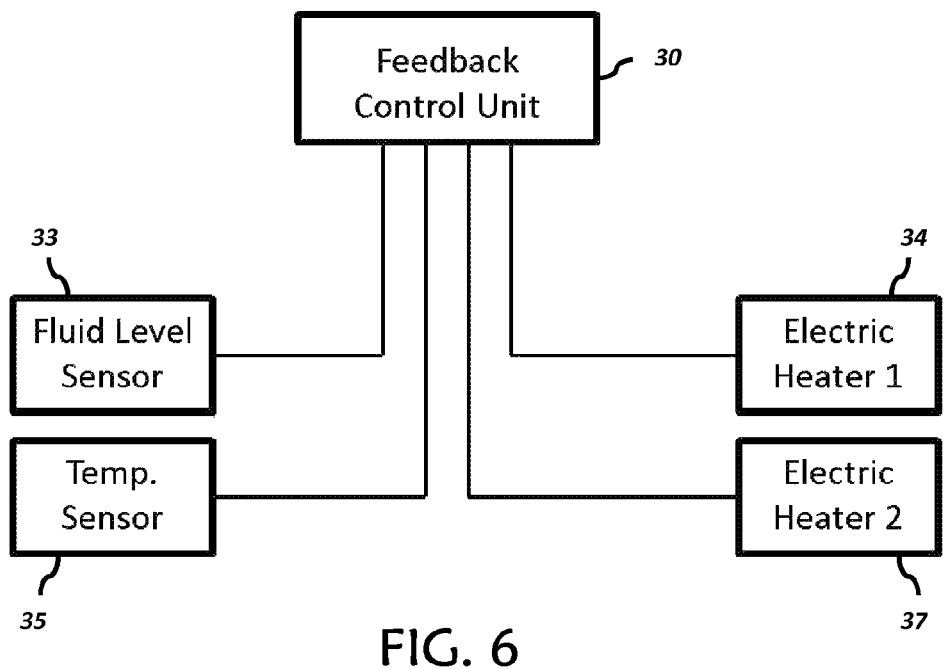
FIG. 6 illustrates a feedback control unit connected to a fluid level sensor, a temperature sensor and multiple electric heaters for dynamic control of liquid level within an evaporation reservoir of a cryostat.

FIG. 6 illustrates another embodiment of the invention, wherein a feedback control unit is connected to a fluid level sensor, a temperature sensor, a first electric heater, and a second electric heater. The feedback control unit is adapted to read fluid level of liquid helium within the evaporation reservoir, and the temperature of one or more regions within the cryostat. The one or more regions may include the specimen region, the evaporation reservoir, the flow restrictor, or other region within the cryostat. By measuring temperature at the evaporation reservoir, the feedback control unit can optimize current to the first electric heater disposed at the evaporation reservoir such that the evaporation rate of liquid helium can be optimally adjusted. Similarly, a temperature reading at or near the flow restricting element can be used by the feedback control unit to optimize current distribution to the second heater disposed at the flow restricting element such that optimal flow can be achieved. As discussed above, a temperature sensor disposed at or near the specimen region can be used to regulate temperature of a sample.

In another embodiment, multiple temperature sensors can be incorporated into the cryostat for dynamic control of the multiple regions therein. One having skill in the art will recognize that one or multiple fluid sensors, one or multiple electric heaters, up to any number of temperature sensors, and a feedback control unit can be combined to assemble a cryostat adapted for dynamic temperature regulation. Additionally, one or more specimen regions can be incorporated near the flow of evaporated gas such that a plurality of samples can be introduced into the cryostat without increasing risks of cross-contamination.

Figure 2B:
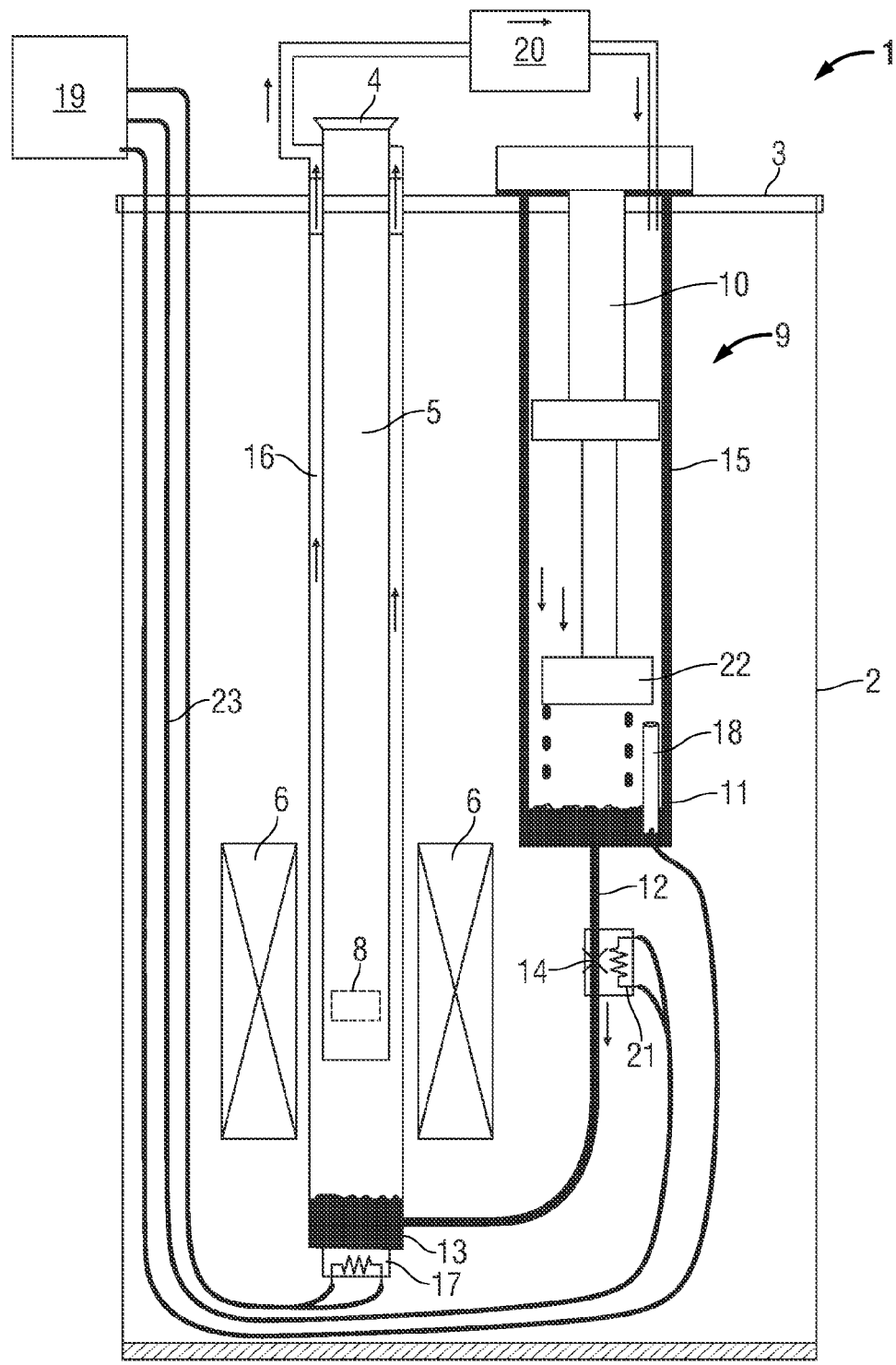

In yet another embodiment, as shown for example in FIG. 2B, a recirculating gas cryostat includes a fluid level sensor 18 in the warm reservoir 11. The fluid level sensor 18 can be used to calculate the level of coolant contained in the evaporation reservoir 13 by deducing the difference between the liquid level and the total system volume of coolant and taking into consideration various conditions such as pressure and temperature in the evaporation region. Still further, a liquid level sensor can be incorporated into the cryostat at both the warm reservoir and the cold reservoir for added input and optimization of the cryostat. In this embodiment, the feedback control unit may be programmed to calculate liquid level at one or more regions within the cryostat.

Figure 7:
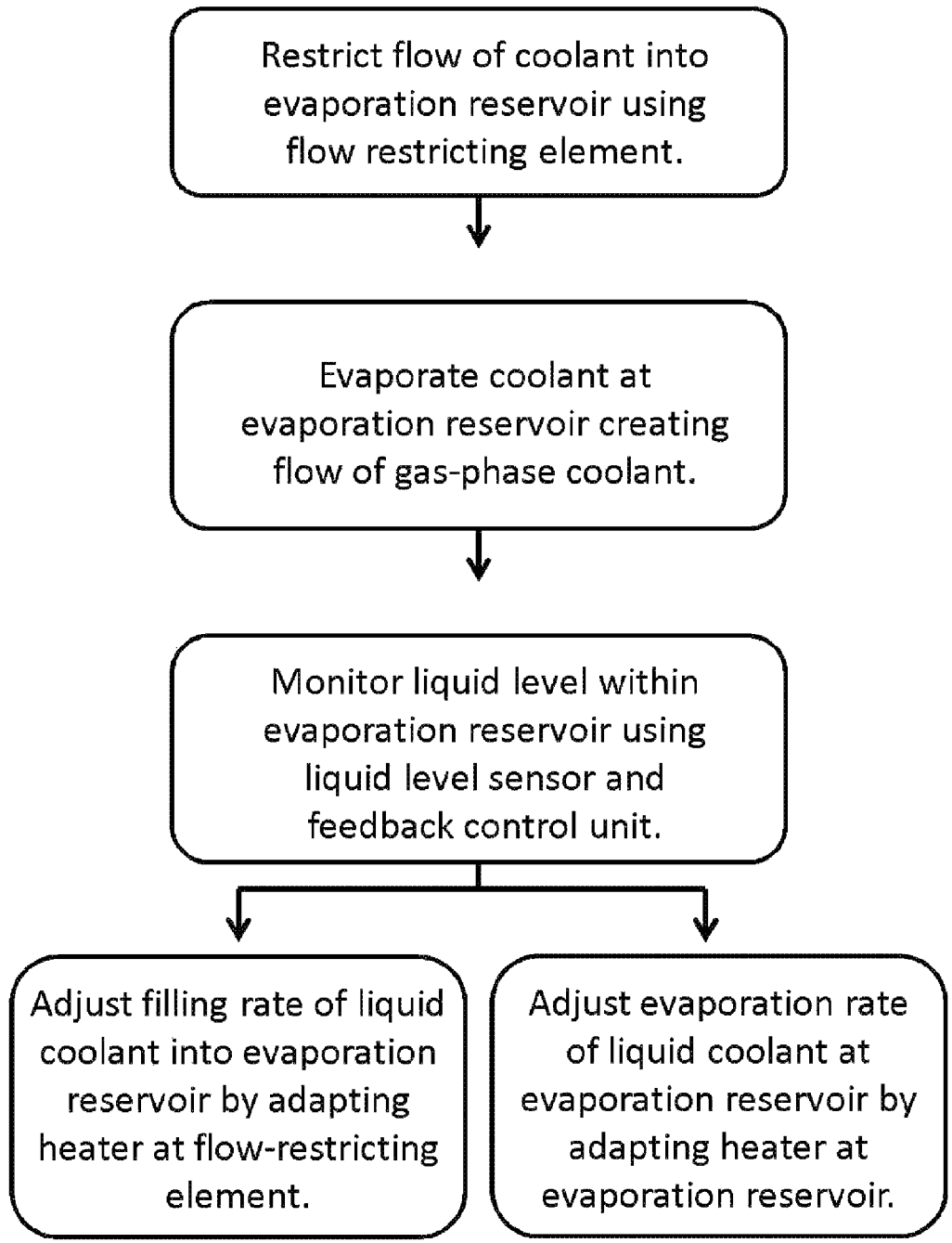
FIG. 7 illustrates a method for dynamically controlling temperature about a specimen region within a cryostat.

In addition to the apparatus described above, certain methods for dynamically controlling temperature about a specimen region within a cryostat would be understood upon a thorough review of the forgoing description. However, for illustrative purposes one may look to FIG. 7 for a general description of a method according to one embodiment of the invention. A more detailed description of the method illustrated in FIG. 7 includes the steps of: (1) restricting a flow of liquid helium into an evaporation reservoir using a flow restricting element; the flow of liquid helium is maintained at a first pressure above the restricting element and a second pressure below the restricting element; wherein said first pressure is greater than said second pressure; (2) measuring an amount of liquid helium contained in the evaporative reservoir using a liquid level sensor; (3) evaporating the liquid helium in a reservoir to create a flow of gas-phase helium; (4) flowing the evaporated gas-phase helium about a region to be cooled; and (5) using a feedback control unit to dynamically control the liquid helium level contained within the evaporative reservoir by altering at least one of: a filling rate, or evaporation rate of the liquid helium in response to the monitored liquid helium level.

As is understood from the forgoing description, the liquid level sensor and feedback control unit can be connected to a number of electric heaters positioned within the cryostat at various component regions, the feedback control unit is therefore capable of adapting the electric heaters to dynamically control energy input at various regions, and therefore control evaporation and filling rates of the cryogenic liquid helium. Various methods for dynamically controlling temperature within a cryostat using a liquid level sensor, feedback control unit, and a number of heaters are therefore enabled by the forgoing description and intended to be within the spirit and scope of the invention.

While exemplary and alternative embodiments of the invention have been presented in detail above, it should be recognized that numerous variations may exist. It should also be appreciated that the described embodiments are only examples, and are not intended to limit the scope, configuration, or applicability of the described invention in any way. It should be understood that various changes can be made in the function and arrangement of elements without departing from the scope as set forth in the appended claims and the legal equivalents thereof.

What is claimed is:

1. A method for cooling and controlling temperature of a region within a cryostat, the method comprising:
    measuring a fluid level of a standing first pool of liquid cryogen contained in an evaporation reservoir using a liquid level meter;
    evaporating at least a portion of the standing first pool of liquid cryogen in the evaporation reservoir to create a flow of a gas-phase cryogen;
    flowing the gas-phase cryogen about the region within the cryostat; and
    using an electronic feedback control unit to maintain the standing first pool of liquid cryogen within the evaporation reservoir at a constant level in response to the measured fluid level of the standing first pool of liquid cryogen by coordinating the control of an evaporation heater in thermal communication with the evaporation reservoir and an impedance heater in thermal communication with a flow restricting element fluidly coupled to the evaporation reservoir, the impedance heater being configured to control a gas-to-liquid ratio within the flow restricting element which is positioned between the standing first pool of liquid cryogen and a separate second pool of liquid cryogen external to the evaporation reservoir,
    wherein said electronic feedback control unit adjusts a filling rate of the liquid cryogen into said evaporation reservoir by applying heat to the liquid cryogen using said impedance heater, and said electronic feedback control unit adjusts an evaporation rate of the standing first pool of liquid cryogen from said evaporation reservoir by applying heat to the standing first pool of liquid cryogen using at least said evaporation heater, and
    wherein, if said evaporation rate is adjusted, the electronic feedback control unit increases or decreases a power dissipated by said evaporation heater simultaneously with decreasing or increasing, respectively, a power dissipated by said impedance heater.

2. The method of claim 1, wherein the level of the standing first pool of liquid cryogen in the evaporation reservoir is controlled to prevent either or both of overfilling the evaporation reservoir and thermal contact with the region within the cryostat.

3. The method of claim 1, wherein an evaporation rate of the standing first pool of liquid cryogen from the evaporation reservoir is adjusted by applying heat to the liquid cryogen via the evaporation and impedance heaters.

4. The method of claim 1, wherein said filling rate of the liquid cryogen into the evaporation reservoir is adjusted by applying heat to the flow restricting element, the flow restricting element being adapted for restricting a flow of the liquid cryogen into the evaporation reservoir.

5. The method of claim 4, wherein said filling rate, if adjusted, is adjusted by applying a first heat to the flow restricting element; and said evaporation rate, if adjusted, is adjusted by applying a second heat to the standing first pool of liquid cryogen contained in the evaporation reservoir; wherein the sum of power dissipated by the first and second heat, if both the filling and evaporation rates are adjusted, is a fixed value.

6. The method of claim 1, further comprising:
    measuring the electrical capacitance of said liquid level meter using a capacitance measuring device; and
    converting said capacitance measurement into the measured fluid level of the liquid cryogen.

7. A cryostat apparatus for regulating temperature of a region within the cryostat apparatus, the apparatus comprising:
    a first liquid reservoir containing liquid cryogen at a first pressure;
    a second liquid reservoir containing a standing amount of liquid cryogen at a second pressure, wherein said second pressure is less than said first pressure;
    a conduit having at least one flow restricting element, said conduit adapted to communicate liquid cryogen from said first liquid reservoir into said second liquid reservoir;
    an evaporation heater in thermal communication with said second liquid reservoir and adapted to selectively alter an evaporation rate of said standing amount of liquid cryogen;
    an impedance heater in thermal communication with said at least one flow restricting element and adapted to selectively alter a flow rate of said liquid cryogen into said second liquid reservoir, said flow rate of said liquid cryogen into said second liquid reservoir being reduced when heat is applied to said at least one flow restricting element by said impedance heater;
    a liquid level meter at least partially contained within said second liquid reservoir for measuring a fluid level of said liquid cryogen in said second liquid reservoir; and
    a feedback control unit adapted to receive the fluid level measurement from said liquid level meter and, in response thereto, to maintain the liquid cryogen at a constant level in said second liquid reservoir by coordinating the control of said evaporation and impedance heaters,
    wherein said feedback control unit is adapted to adjust said flow rate of said liquid cryogen into said second liquid reservoir by applying heat to the liquid cryogen using said impedance heater, and said feedback control unit is adapted to adjust said evaporation rate of the standing amount of liquid cryogen from said evaporation reservoir by applying heat to the standing amount of liquid cryogen using at least said evaporation heater, and
    wherein the feedback control unit is adapted to, if said evaporation rate of the standing amount of liquid cryogen from said evaporation reservoir is adjusted, increase or decrease a power dissipated by said evaporation heater simultaneously with decreasing or increasing, respectively, a power dissipated by said impedance heater.

8. The apparatus of claim 7, wherein the region within the cryostat apparatus is cooled by a flow of evaporated gas from the second liquid reservoir.

9. The apparatus of claim 7, further comprising a pumping system suitable for reducing the second pressure of said liquid cryogen in the second liquid reservoir to less than the first pressure of said liquid cryogen in the first liquid reservoir.

10. The apparatus of claim 8, wherein said apparatus is adapted for flowing gas-phase cryogen from the second liquid reservoir to an inlet of said pumping system, whereby the flowing cryogen is in thermal contact with the region within the cryostat apparatus.

11. The apparatus of claim 8, wherein the region within the cryostat apparatus is a specimen chamber within a laboratory instrument.

12. The apparatus of claim 7, further comprising:
a source of liquefied cryogen;
wherein the source of liquefied cryogen includes recirculated cryogen gas; and
wherein the recirculated cryogen gas is condensed by a cryogenic cooler located at least partially within said cryostat.

13. The apparatus of claim 7, wherein said at least one flow restricting element is selected from the group consisting of: a capillary tube, porous filter, and an orifice.

14. The apparatus of claim 7, wherein said liquid level meter comprises: an electric capacitor arranged to measure the difference in dielectric constant between gas-phase and liquid-phase of the cryogen.

15. The apparatus of claim 7, wherein said cryogen is any isotope of helium, nitrogen, hydrogen, or neon.

16. The method of claim 1, wherein the evaporation and impedance heaters are simultaneously controlled such that a sum of the power dissipated by the evaporation and impedance heaters is a fixed value, and a ratio of the power in each of the evaporation and impedance heaters is controlled to maintain the standing first pool of liquid cryogen at said constant level.

17. The method of claim 16, wherein controlling the ratio of the power in each of the evaporation and impedance heaters includes increasing the power in the impedance heater and decreasing the power in the evaporation heater to decrease the fluid level of the standing first pool of liquid cryogen in the evaporation reservoir.

18. The method of claim 16, wherein a filling rate of the liquid cryogen into the evaporation reservoir is controllable by the feedback control unit separate from control of an evaporation rate of the liquid cryogen contained in the evaporation reservoir, the filling rate being determined by the power in the impedance heater, and the evaporation rate being determined by the sum of the power in the evaporation and impedance heaters.

19. The apparatus of claim 7, wherein said feedback unit is adapted to simultaneously control said evaporation and impedance heaters such that a sum of the power dissipated thereby is a fixed value, and a ratio of the power in each of said evaporation and impedance heaters is controlled to maintain said liquid cryogen at said constant level.

20. The apparatus of claim 19, wherein said feedback control unit is further adapted to control a filling rate of said liquid cryogen into said second liquid reservoir separate from control of an evaporation rate of said liquid cryogen contained in said second liquid reservoir, wherein said filling rate is determined by the power in said impedance heater, and wherein said evaporation rate is determined by the sum of the power in said evaporation and impedance heaters.

* * * * *